United States Patent [19]
Breitzmann

[11] Patent Number: 5,530,323
[45] Date of Patent: Jun. 25, 1996

[54] DRIVE SYNCHRONIZATION SYSTEM FOR PLURAL MOTOR SYSTEMS

[75] Inventor: Robert J. Breitzmann, South Russell, Ohio

[73] Assignee: Reliance Electric Industrial Company, Euclid, Ohio

[21] Appl. No.: 306,013

[22] Filed: Sep. 14, 1994

[51] Int. Cl.$^6$ ............................................. H02P 5/46
[52] U.S. Cl. .................... 318/85; 318/41; 318/50; 364/143
[58] Field of Search ............................ 318/591, 594, 318/603, 675, 685, 562, 616, 625, 565, 41, 49, 50, 85; 364/181, 167.01, 165, 176, 184, 143

[56] References Cited

U.S. PATENT DOCUMENTS

| | | | |
|---|---|---|---|
| 4,277,731 | 7/1981 | Pongracz | 318/685 |
| 4,629,956 | 12/1986 | Nozawa et al. | 318/616 |
| 4,669,042 | 5/1987 | Henderson et al. | 318/591 |
| 4,695,941 | 9/1987 | Kumar | 364/165 |
| 4,888,538 | 12/1989 | Dimitrov et al. | 318/675 |
| 5,231,335 | 7/1993 | Mega et al. | 318/625 |

*Primary Examiner*—John W. Cabeca
*Attorney, Agent, or Firm*—James A. Hudak; John M. Miller; John J. Horn

[57] ABSTRACT

A system for synchronizing a plurality of motors is disclosed. The system includes a universal drive controller which can control the operation of two motors, a power module for each motor, and a power module interface rack which is utilized to interconnect the motor to its associated universal drive controller. If a plurality of universal drive controllers is involved, a common clock is utilized to synchronize the operation of same.

Synchronization of the motors is achieved by monitoring the output shaft of each motor through the use of a resolver, transmitting feedback data relative to the position of the output shaft to the universal drive controller via the power module interface rack, calculation of command data by the universal drive controller to effect synchronization, and transmitting the command data to the power module interface rack wherein the power module causes the proper firing signals to be transmitted to the associated motor. Since the operation of the universal drive controller is synchronized, and each motor is synchronized to its associated universal drive controller through its associated power module interface rack, the operation of all of the motors is synchronized.

8 Claims, 5 Drawing Sheets

DRIVE SYNCHRONIZATION SYSTEM FOR PLURAL MOTOR SYSTEMS

TECHNICAL FIELD

The present invention relates, in general, to a system for synchronizing the operation of a plurality of motors and, more particularly, to a system where the power and control apparatus for the motors to be synchronized is located in close proximity to the motors.

BACKGROUND ART

Cost efficient control of a plurality of motor drives has been a goal of most drive system suppliers. In the distant past, such efficiency was achieved mechanically by a motor driving a line shaft having gears and pulleys attached thereto to drive apparatus at various work stations. A more modern approach utilizes a motor at each work station, thus eliminating the line shaft, but such an approach requires synchronization of the control apparatus associated with each motor. In effect, the control apparatus provides an "electronic line shaft" to ensure drive synchronization. Such approaches typically also require extremely long control wiring and power wiring runs from a central controller to each of the motors. This is particularly the case if the motors are located in a hostile environment requiring that the control apparatus be located some distance away in a more desirable environment. Such long wiring runs are susceptible to losses and to radio frequency interference. In addition, such long wiring runs are extremely expensive to install and maintain.

In view of the foregoing, it has become desirable to develop a synchronization system for a plurality of motors wherein the wiring from the control apparatus and power apparatus to the motor is minimized and wherein any communication from the control and/or power apparatus to a drive controller is over fiber optic cables thus eliminating the problems associated with long wiring runs and radio frequency interference.

SUMMARY OF THE INVENTION

The present invention overcomes the problems associated with the prior art and other problems by providing a distributed power unit assembly in close proximity to each motor whose operation is being synchronized. The distributed power unit assembly includes a power module and a power module interface rack. Each power module interface rack includes a separate card for a power supply, processor, resolver and the drive technology employed. The processor within the power module interface rack, which is connected to both the power module and to the motor, processes input/output and speed feedback signals and produces the firing signals which are transmitted to the power module that controls the operation of the motor. The processor within the power module interface rack is connected, via a fiber optic cable link, to a universal drive controller located remotely from the distributed power unit assembly. Each universal drive controller can control and synchronize the operation of two motors. Since ten universal drive controllers can typically be received within a rack, and each universal drive controller can synchronize the operation of two motors, a rack of ten universal drive controllers can control and synchronize the operation of twenty motors through the use of twenty fiber optic cable links.

To synchronize the operation of a plurality of motors requires that the position of the output shaft of each motor be monitored. Such monitoring can be accomplished through the use of a resolver connected to the output shaft of the motor. Synchronization of the motors is achieved through the generation and transmission of synchronization dam between the processor within a power module interface rack and the processor in its associated universal drive controller via the fiber optic cable link connecting same. If there is a plurality of universal drive controllers, a common clock is provided along the backplane of the rack containing the universal drive controllers to synchronize the operation of same.

To effect synchronization of the operation of the motors, each power module interface rack is provided with a separate crystal oscillator which is utilized to measure time. The clock ticks produced by the oscillator within each power module interface rack are counted and are utilized to determine the period for sampling the resolver for the associated motor. After the resolver has been sampled, an indication of motor shaft position is transmitted by the processor in the power module interface rack to the processor in the associated drive universal drive controller via the fiber optic cable link. The processor within the universal drive controller calculates new motor commands and transmits same, via the fiber optic cable link, to the processor within the power module interface rack which, in turn, transmits the commands to its power module for transmission to its associated motor. Since the operation of the universal drive controllers is synchronized, and each motor is synchronized to its associated universal drive controller through its associated power module interface rack, the operation of all of the motors within the plurality of motors is synchronized.

DESCRIPTION OF THE PREFERRED EMBODIMENT

Figure 1:
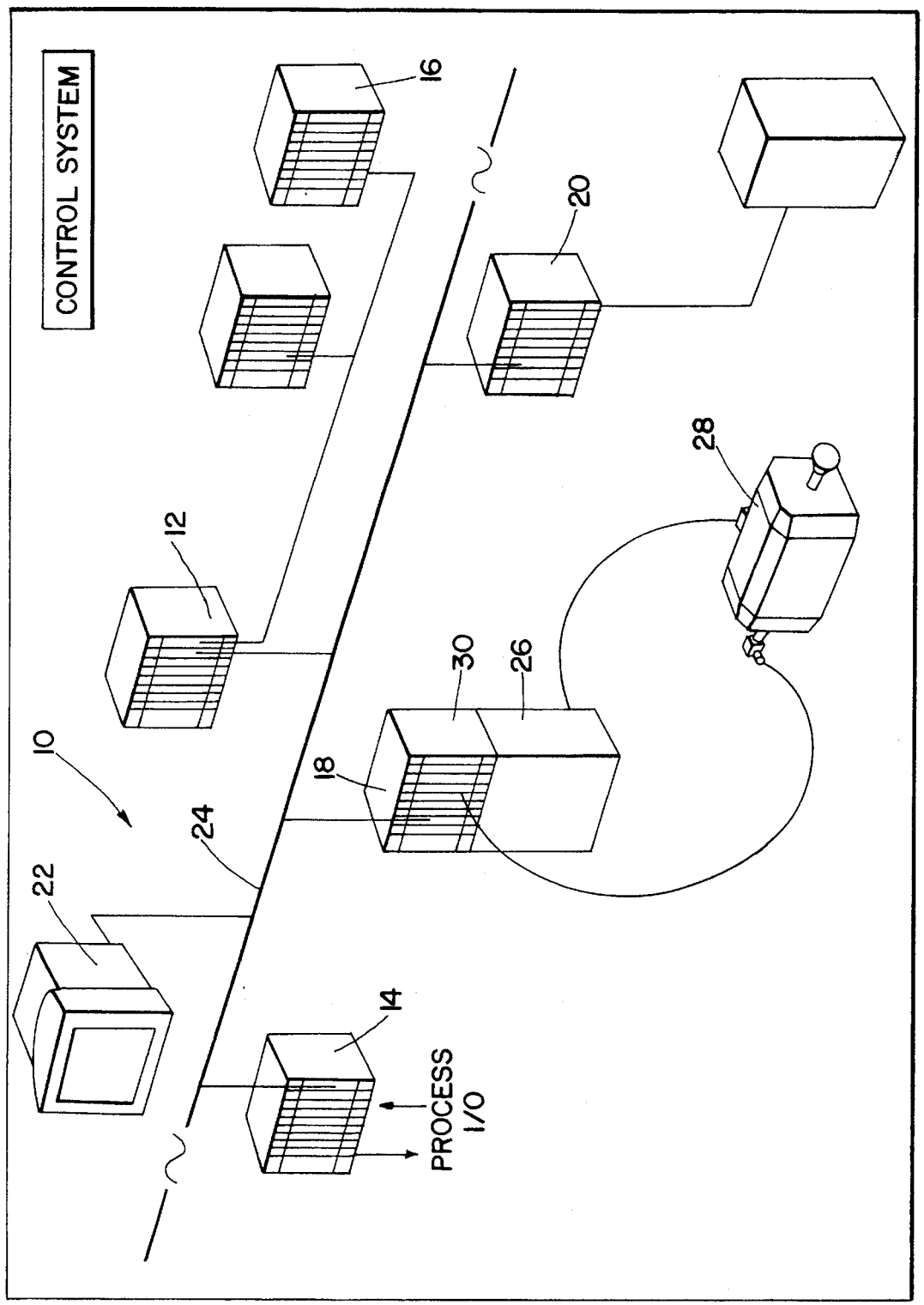
FIG. 1 is a schematic diagram of a distributed electrical control system of the prior art.

Referring now to the drawings where the illustrations are for the purpose of describing the preferred embodiment of the present invention and are not intended to limit the invention described herein, FIG. 1 is a schematic diagram of a distributed electrical control system 10 of the prior art. System 10 includes a system level integration controller 12, a process controller 14, remote input/output units 16, a drive system control 18, a setpoint control 20, and a man-machine interface 22 which is typically in the form of a keyboard and monitor, all interconnected by a common bus 24, and a power module 26 which must be located near the drive system control 18. Assuming that the drive system control 18 is for a variable speed D.C. motor 28, then rack 30 which contains the controls for this motor will include a four card set which produces the armature firing signals to the power module 26. In addition, a resolver card is required to process the speed/position feedback signal from the motor, a processor card is needed to execute the major and minor time motor control loops, and a field regulator card may be required. Thus seven cards are typically required to control one motor. Generally, one rack can accommodate the controls for two motors, at most. When two motors are involved, a common memory card must be included in the rack 30 to share the common variables for the two processor cards (one processor card for each motor) and a network card is required to permit communication with the other drive sections. Because of this, control of two motors requires the full use of the rack 30. Furthermore, the racks 30 must be mounted with the power modules 26 in the drive enclosure lineup since the distance between certain cards, e.g., the four card set and the field regulator card, and the power module 26 must be minimized.

Figure 2:
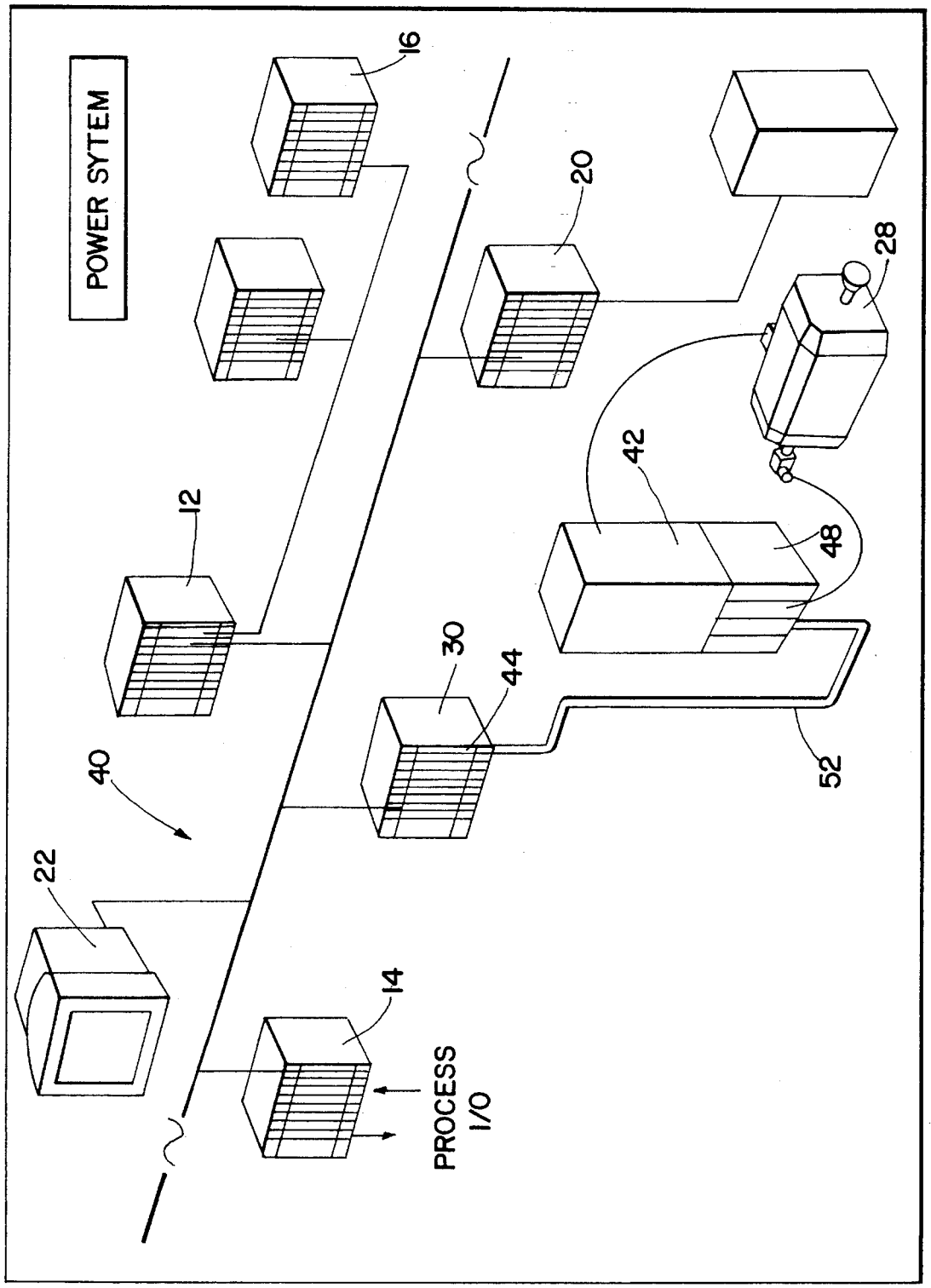
FIG. 2 is a schematic diagram of a distributed power system utilizing the principles of the present invention.
Figure 3:
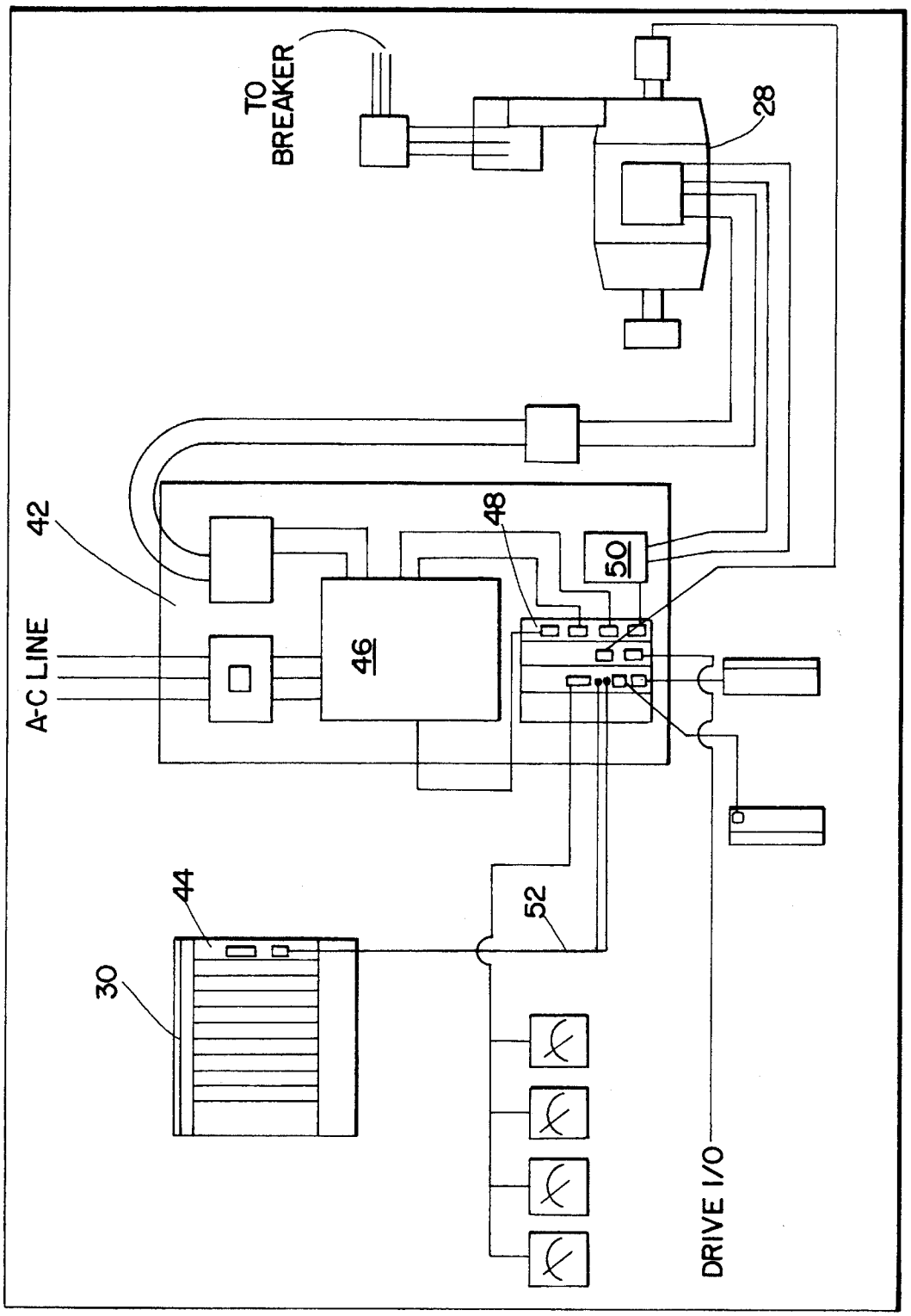
FIG. 3 is a schematic diagram of the distributed power system of the present invention showing the interconnection of the power unit assembly to the other components in the system.
Figure 4:
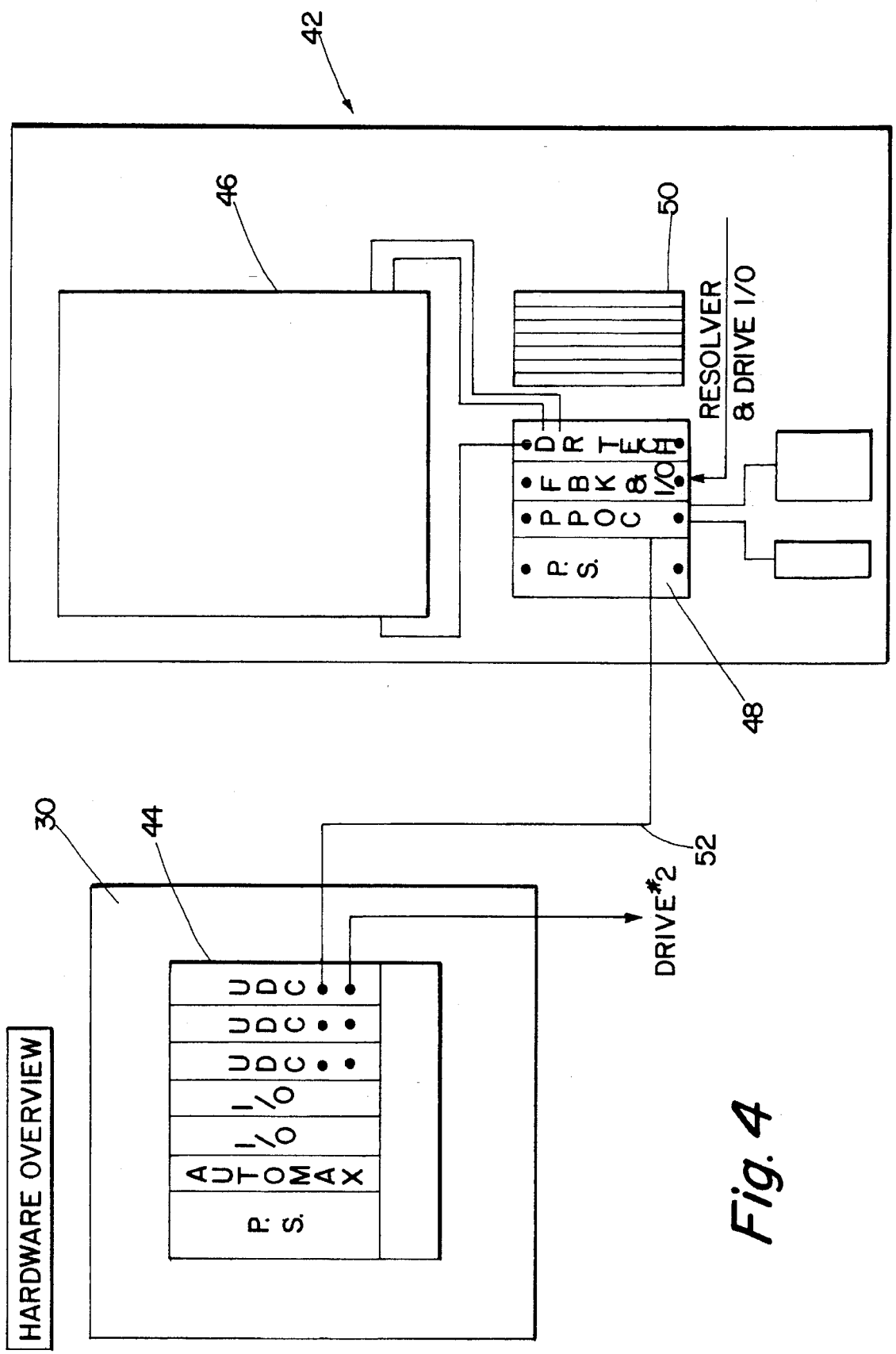
FIG. 4 is a schematic diagram of the power module interface rack utilized by the present invention showing its interconnection to its associated universal drive controller and power modules.

Referring now to FIGS. 2, 3 and 4 a distributed power system 40 utilizing the principles of the present invention is disclosed. Those components which are similar to the components shown in FIG. 1 carry the same reference numerals and will not be described further. In this case, power is provided to the motor 28 by a distributed power unit assembly, shown generally by the numeral 42, and control is effected by a universal drive controller 44 which is in the form of a card in rack 30. The distributed power unit assembly 42 includes a power module 46 and a power module interface rack 48. In the case of D.C. drives, a separate field control power module 50 is also provided in the power unit assembly 42. Each power module interface rack 48 includes a separate module for its power supply, processor, resolver and feedbacks, and the drive technology utilized. The first three of these modules are common for any drive type, thus providing a common programming environment and control architecture for all types of drives. The remaining module, i.e., the drive technology module, and the power module 46 are the only system components that change from one power technology to another, i.e., from A.C. drives to D.C. drives and vice versa. The power supply module, through its connection to the backplane of the power module interface rack 48, provides the power necessary for the operation of all of the modules in the rack 48. The processor module controls communication within the power module interface rack 48. The processor module also executes the armature and field current regulation algorithms and transmits input/output values, speed feedback data, and diagnostic information to the associated universal drive controller 44 over the fiber optic cable link 52. The resolver and feedback module converts the analog resolver feedback signals into digital format for use by the processor module, and also provides input connections for analog and other drive input/output devices. The drive technology module digitizes all armature and field signals produced by the power module for use in the armature and field current regulation algorithms. Based on the feedback inputs and the current reference value provided by the universal drive controller, the processor module executes the armature and field current regulation algorithms and outputs firing angle information to the drive technology module which, in turn, provides the proper firing signals to the power devices in the power module 46 and, when field control is required, to the field control power module 50.

The universal drive controller 44 is connected to the processor module within the power module interface rack 48 by a fiber optic cable link 52. User analog input/output devices and digital and/or analog rail devices are also connected to the processor module within the power module interface rack 48. The resolver and drive input/output devices are connected to the resolver and feedback module in the power module interface rack 48. The drive technology module in the power module interface rack 48 is connected to the power module 46 and, if a D.C. drive is involved, to the field control power module 50. An armature current feedback loop interconnects the power module 46 with the drive technology module.

A power module 46 and a power module interface rack 48 are provided for each motor 28. One universal drive controller 44 can control and synchronize the operation of two motors. If more than two motors require synchronization, an additional universal drive controller 44 is required for each additional two motor grouping. Since ten universal drive controllers 44 can be received within rack 30, and each universal drive controller 44 can synchronize the operation of two motors, a rack of ten universal drive controllers can control and synchronize the operation of twenty motors.

The power module interface rack 48 provides the fiber optic communication interface with the universal drive controller 44. The processor module within the power module interface rack 48 runs the minor loop algorithm (current for D.C. drives/vector for A.C. drives) and processes input/output and speed feedback signals. In addition, it produces the firing signals for the power module 46 and collects diagnostic data relative to the power module 46 and the motor 28 and transmits same, via the fiber optic cable link 52, to the universal drive controller 44.

The processor within the universal drive controller 44 and the processor within the power module interface rack 48 are RISC (Reduced Instruction Set Computer) processors. The processor within the universal drive controller 44 is a full 32 bit device, whereas the processor within the power module interface rack 48 is a 32 bit internal/16 external device. RISC processors contain multiple arithmetic processing units, and thus, are capable of performing multiple mathematical operations simultaneously. This feature, in conjunction with high operating frequencies, provides extremely fast system operation.

The resolver and feedback module contains a digital converter and drive related input/output structure. The digital converter converts the analog sine and cosine resolver feedback signals into digital signals required by the system. The resolver system is automatically tuned to compensate for wire length (up to 500 feet) between the resolver and the power module interface rack 48. The input/output functions provided are those which would normally be used to control any drive type.

As previously indicated, the drive technology module and the power module 46 are the only components which must be changed depending upon the type of power utilized by the system. The D.C. power technology module receives the analog armature current feedback signals required to implement the real time control loops. Based on these feedback signals and the reference signals for the current minor loop provided by the associated universal drive controller 44 via the fiber optic cable link 52, the processor within the power module interface rack 48 runs the current minor loop algorithm and provides firing time data to the D.C. drive technology card which, in turn, provides the proper firing signals to the power devices within the associated armature power module. The same drive technology module can be utilized for both regenerative and non-regenerative drives. If regeneration is not provided, the firing signals to the power devices are withheld and the regenerative firing outputs are not connected to the armature power module. The D.C.

power technology module also includes a field regulator circuit which provides firing signals to the field control power module when field control is required. Thus, field current regulation can be implemented. The A.C. power technology module provides the same functions for an A.C. drive as the D.C. power technology module provides for a D.C. drive. Based on the analog feedback signals and the current minor loop reference signals received from the universal drive controller 44, the processor within the power module interface rack 48 runs the current minor loop algorithm and provides firing frequency and amplitude data to the A.C. power technology module which, in turn, provides the proper firing signals to the power devices in the associated A.C. power module. The same A.C. power technology module can be used for both open loop (V/Hz) and closed loop (vector) control.

The motors in a distributed power system may be located in a hot, dirty and/or corrosive environment, and the controls for same may be some distance from the motors causing the interconnecting wire installation to be quite long and expensive. Such long wire runs are also susceptible to resistance losses and radio frequency interference. The present invention uses the fiber optic cable link 52 to interconnect the universal drive controller 44 and the power module interface rack 48 associated with each motor 28. The use of fiber optic cable links overcomes the foregoing problems associated with prior art wire installations.

The purpose of the present invention is to provide a technique for synchronizing the operation of a plurality of motors in a distributed power system. To control the operation of such motors requires the monitoring of the position of the output shaft of each motor. Typically, a position transducer, such as a resolver connected to the output shaft of the motor, can provide an indication of the position of the shaft. To maintain synchronization of a plurality of motors requires that the position of each motor shaft be determined by its associated resolver; that as a result of the foregoing determination, appropriate corrective command messages be developed for each motor by its associated universal drive controller; and that the foregoing command messages be transmitted to the proper motor. Each of the foregoing steps must occur simultaneously at each motor in order to effect motor synchronization. In essence, the processor within a power module interface rack 48 is synchronized with the processor in its associated universal drive controller 44 by transmitting synchronization dam over the associated fiber optic cable link 52. If there is a plurality of universal drive controllers 44, a common clock, which in this case has a frequency of 4 MHz, is provided along the backplane of the rack 30 to synchronize the operation of these controllers. Each universal drive controller 44 has an internal 16 bit down-counter which is utilized to count the clock ticks provided by the common clock.

Each power module interface rack 48 is provided with a separate 4 MHz crystal oscillator which is utilized to measure time. The clock ticks produced by the oscillator within each power module interface rack 48 are counted by a 16 bit down counter within the rack 48 and are utilized to determine the period for sampling the resolver for the associated motor 28. When the resolver is sampled, an indication of motor shaft position is forwarded by the processor in the power module interface rack 48 to the associated universal drive controller 44 via the fiber optic cable link 52 and a universal drive controller scan is initiated. The processor within the universal drive controller 44 calculates a new motor command message and transmits same, via the fiber optic cable link 52, to the processor within the power module interface rack 48 which, in turn, transmits the commands to its power module for transmission to its associated motor 28.

Figure 5:
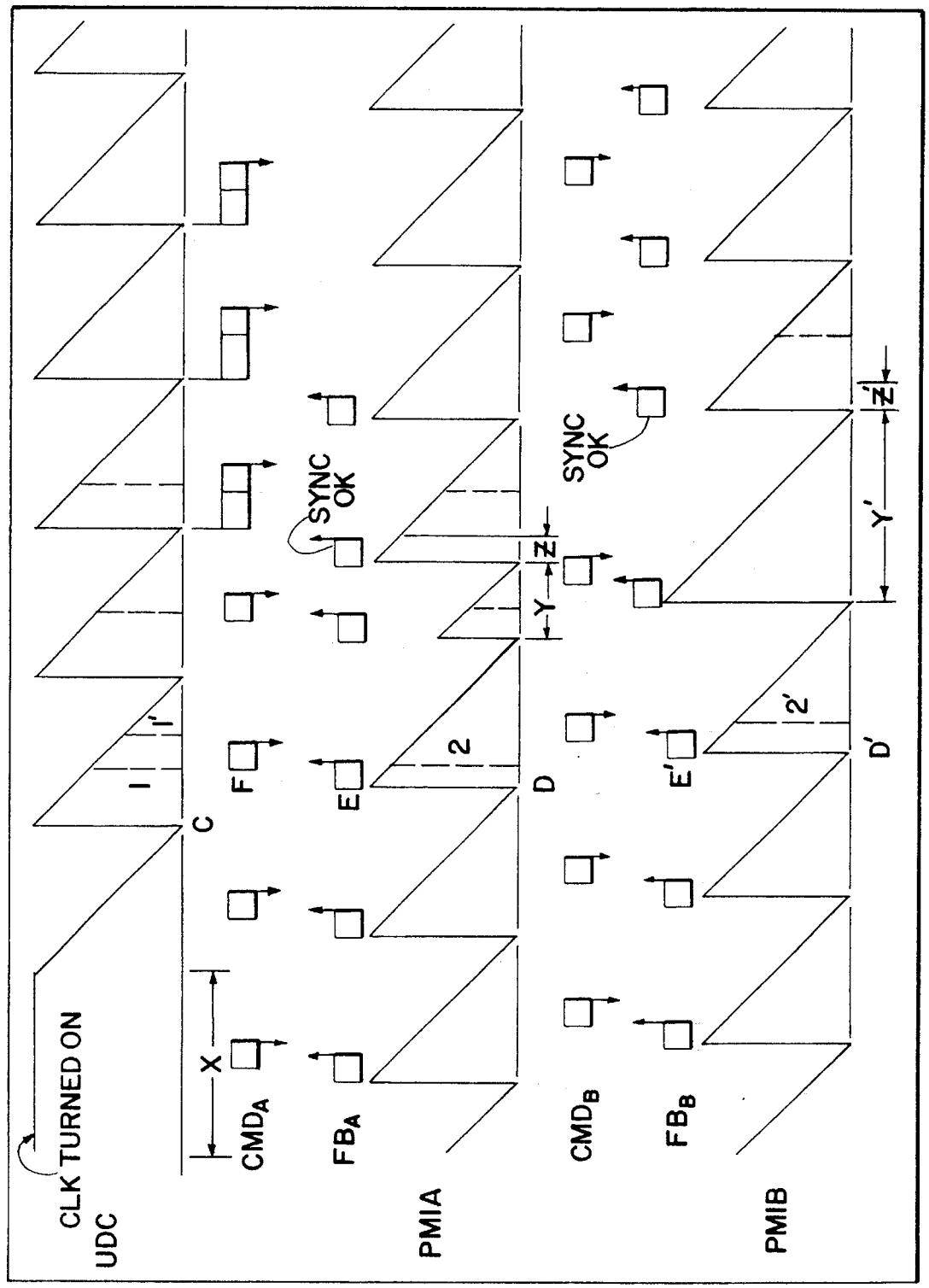
FIG. 5 illustrates waveforms for the contents of the down counters in the universal drive controller and in power module interface racks A and B of the present invention.

Referring now to FIG. 5, the waveform depicting the value within the down counter with respect to time for a universal drive controller is illustrated as waveform UDC, and the wave forms depicting the value within the down counters with respect to time for associated power module interface racks A and B are illustrated as waveforms PMIA and PMIB, respectively. The signals from the processors within the power module interface racks A and B which are transmitted to the processor within the universal drive controller are illustrated as feedback messages $FB_A$ and $FB_B$, respectively. Similarly, the command messages from the processor within the universal drive controller which are transmitted to the processors within the power module interface racks A and B are shown as command messages $CMD_A$ and $CMD_B$, respectively. With respect to that portion of the waveforms within the time interval X, the common clock for the universal drive controllers 44 is turned "off," and thus the operation of the system is asynchronous. During this time interval, the processors within the power module interface racks A and B are transmitting feedback messages $FB_A$ and $FB_B$, respectively, to the processor within the universal drive controller, and the processor within the universal drive controller immediately transmits command messages $CMD_A$ and $CMD_B$, to the processor within the power module interface racks A and B, respectively. The feedback messages result from the processor within each power module interface rack sampling its associated resolver for an indication of the shaft position of its associated motor 28 and are in the form of signals representative of that position. Initially, a default period of approximately 10 milliseconds is loaded into the processors within the power module interface racks A and B for diagnostic purposes. After communication has been established, the command messages $CMD_A$ and $CMD_B$ from the universal drive controller set the sampling period of the processor within each power module interface rack to the sampling period utilized by the universal drive controller. When the common clock for the universal drive controllers is subsequently turned "on," the counter for each universal drive controller 44 begins counting down at exactly the same time. Because all of the universal drive controllers 44 are connected to a 4 MHz common clock, synchronization of all of the universal drive controllers 44 is achieved.

After the common clock for the universal drive controllers 44 is turned "on," the processors within the power module interface racks A and B continue to transmit feedback messages $FB_A$ and $FB_B$, respectively, representative of shaft position of its associated motor. Referring now to waveform PMIA, which is representative of the value in the down counter in the power module interface rack A, waveform PMIA is not in synchronization with the UDC waveform. After the first common clock interrupt occurs at point C, the universal drive controller commences processing feedback signals in a different manner. The next clock interrupt for power module interface rack A, which occurs at point D, causes the processor within power module interface rack A to transmit a feedback message (signal E) representative of motor shaft position to the processor within the universal drive controller. Upon receipt of the feedback message (signal E) from the processor within power module interface rack A, the processor within the universal drive controller transmits a command message (signal F) to the processor within the power module interface rack A. The command message (signal F) is comprised of the value in the down counter for the universal drive controller, illustrated as value 1. Upon receipt of the command message (signal F) by the processor within the power module interface rack A, the value in its down counter, illustrated as value 2, is latched. The difference between the values in the down counter for the universal drive controller (value 1) and the down counter latched for power module interface rack A (value 2) is utilized to adjust the next sampling period, shown as time interval Y, during which the processor within power module interface rack A samples its associated resolver. In this case, the sampling period is shortened. To compensate for the time required to transmit a signal from the processor within power module interface rack A to the processor within the universal drive controller, the down counter for the power module interface rack A is phased a fixed amount of time Z ahead of the down counter for the universal drive controller. After the initial correction is made to synchronize the operation of power module interface rack A with the universal drive controller, any error between same is integrated over time. When the resulting integrated error exceeds a predetermined value, the period during which the processor within a power module interface rack samples its associated resolver is adjusted to achieve a steady state condition where the present value in the down counter within the power module interface rack and the value in the down counter for the universal drive controller may differ but the resulting periods are the same.

The same approach is taken with respect to waveform PMIB which is representative of the value in the down counter in power module interface rack B and is not in synchronization with the UDC waveform. In this case, after the first common clock interrupt at point C, the next clock interrupt for power module interface rack B (point D') causes the processor within the power module interface rack B to transmit a feedback message (signal E') representative of motor shaft position to the processor within the universal drive controller. Upon receipt of the feedback message (signal E'), the processor within the universal drive controller transmits a command message (signal F') to the processor within the power module interface rack B. Signal F' is comprised of the value in the down counter for the universal drive controller, illustrated as value 1'. Upon receipt of signal F' by the processor within the power module interface rack B, the value in its down counter, illustrated as value 2', is latched. The difference between the values in the down counter for the universal drive controller (value 1') and the down counter latched for power module interface rack B (value 2') is utilized to adjust the next sampling period, shown as time Y', for power module interface rack B. In contrast to the aforementioned adjustment in the sampling period for power module interface rack A, in this case the sampling period for power module interface rack B is increased. Here again, the down counter for the power module interface rack B is phased a fixed amount of time Z' ahead of the down counter for the universal drive controller to compensate for the time required to transmit a signal from the processor for power module interface rack B to the processor for the universal drive controller. The determination as to whether to create a long or a short adjustment in the sampling period is based on the objective of limiting the adjustment to one-half of the normal sampling period or less.

After a power module interface is synchronized with its universal drive controller, the timing of the feedback messages from the power module interface to the universal drive controller is such that the feedback messages arrive at the universal drive controller before the common clock "ticks" in the universal drive controller. When the common clock "ticks," the universal drive controller calculates new command data based on the feedback message and, upon completion, transmits the command message to the power module interface.

Certain modifications and improvements will occur to those skilled in the art upon reading the foregoing. It should be understood that all such modifications and improvements have been deleted herein for the sake of conciseness and readability but are properly within the scope of the following claims.

I claim:

1. Apparatus for synchronizing the operation of a plurality of motors comprising:

a drive controller controlling the operation of at least one motor within the plurality of motors;

a power module associated with each motor within the plurality of motors;

an interface interconnecting said drive controller to said power module, said interface including a processor cooperating with said drive controller controlling the application of power to said motor by said power module;

means for providing signals representative of an operating parameter of said motor, said signal providing means periodically sampling the operation of said motor with respect to said operating parameter and transmitting a signal representative of said operating parameter to said drive controller causing said drive controller to transmit a corrective signal to said processor within said interface to synchronize the operation of said processor with the operation of said drive controller; and means for compensation for the time required to transmit said signal representative of said operating parameter to said drive controller.

2. The apparatus as defined in claim 1 further including fiber optic cable means connecting said drive controller to said interface.

3. The apparatus as defined in claim 1 wherein said interface interconnects said signal providing means to said drive controller.

4. The apparatus as defined in claim 1 wherein said signal providing means comprises a resolver associated with the motor whose operation is being controlled by said drive controller.

5. The apparatus as defined in claim 1 further including means for synchronizing the operation of a plurality of drive controllers each utilized to control the operation of at least one motor.

6. The apparatus as defined in claim 1 further including means for synchronizing the operation of a plurality of drive controllers each utilized to control the operation of a plurality of motors.

7. The apparatus as defined in claim 1 further includes means for providing power to the field of a motor.

8. The apparatus as defined in claim 1 wherein said interface is located in relative close proximity to the motor whose operation is being controlled.

\* \* \* \* \*